United States Patent
Enamandram et al.

(10) Patent No.: US 12,511,244 B2
(45) Date of Patent: Dec. 30, 2025

(54) INTERLEAVING OF HETEROGENEOUS MEMORY TARGETS

(71) Applicant: Intel Corporation, Santa Clara, CA (US)

(72) Inventors: Anand K. Enamandram, Folsom, CA (US); Rita Deepak Gupta, Cedar Park, TX (US); Robert A. Branch, Portland, OR (US); Kerry Vander Kamp, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 859 days.

(21) Appl. No.: 17/557,963

(22) Filed: Dec. 21, 2021

(65) Prior Publication Data

US 2022/0114115 A1    Apr. 14, 2022

(51) Int. Cl.
*G06F 13/12* (2006.01)
*G06F 13/16* (2006.01)

(52) U.S. Cl.
CPC ...... *G06F 13/1647* (2013.01); *G06F 13/1668* (2013.01)

(58) Field of Classification Search
CPC .............. G06F 13/1647; G06F 13/1668
See application file for complete search history.

(56) References Cited

U.S. PATENT DOCUMENTS

| | | | | |
|---|---|---|---|---|
| 6,115,797 A * | 9/2000 | Kanda | ........... | G06F 3/0661 711/149 |
| 7,155,582 B2 * | 12/2006 | Ross | ........... | G06F 13/1631 710/36 |
| 7,366,839 B2 * | 4/2008 | Yagisawa | ........... | G06F 3/0689 711/114 |
| 7,461,245 B2 * | 12/2008 | Nakayama | ........... | G06F 3/0614 711/111 |
| 7,506,191 B2 * | 3/2009 | Liang | ........... | G06F 1/32 713/323 |
| 8,296,476 B2 * | 10/2012 | Zhang | ........... | G06F 3/0671 710/17 |
| 8,665,680 B2 * | 3/2014 | Matono | ........... | G06F 3/0605 369/47.12 |
| 9,122,498 B2 * | 9/2015 | Liang | ........... | G06F 3/0656 |
| 9,367,492 B2 * | 6/2016 | Shiomi | ........... | H04L 67/1097 |
| 10,628,364 B2 * | 4/2020 | Shim | ........... | G06F 3/0688 |
| 10,795,835 B2 * | 10/2020 | Yang | ........... | G06F 11/1012 |

(Continued)

FOREIGN PATENT DOCUMENTS

NL    2029099 A    6/2022

OTHER PUBLICATIONS

Wikipedia, "Interleaved Memory," retrieved from https://en.wikipedia.org/w/index.php?title=Interleaved_memory&oldid=1050956690, at least as early as Oct. 20, 2021. (3 pages).

(Continued)

*Primary Examiner* — Cheng Yuan Tseng
(74) *Attorney, Agent, or Firm* — Alliance IP, LLC (57) ABSTRACT

An apparatus comprising a first memory interface of a first type to couple to at least one first memory device; a second memory interface of a second type to couple to at least one second memory device; and circuitry to interleave memory requests targeting contiguous memory addresses among the at least one first memory device and the at least one second memory device.

20 Claims, 5 Drawing Sheets

(56) References Cited

U.S. PATENT DOCUMENTS

| | | | |
|---|---|---|---|
| 11,003,395 B2* | 5/2021 | Park | G11C 16/26 |
| 11,200,106 B2* | 12/2021 | Balakrishnan | G06F 11/1068 |
| 11,226,895 B2* | 1/2022 | Lee | G06F 9/4881 |
| 11,494,318 B2* | 11/2022 | Cho | G06F 13/1668 |
| 11,669,470 B2* | 6/2023 | Jeong | G06F 3/0631 |
| | | | 710/5 |
| 11,755,241 B2* | 9/2023 | Park | G06F 3/0656 |
| | | | 711/154 |
| 11,762,590 B2* | 9/2023 | Cho | G06F 3/0656 |
| | | | 711/154 |
| 11,789,652 B2* | 10/2023 | Koo | G06F 3/0611 |
| | | | 711/100 |
| 2003/0206442 A1* | 11/2003 | Tang | G11C 16/102 |
| | | | 365/185.17 |
| 2007/0266187 A1* | 11/2007 | Senoo | H03M 13/27 |
| | | | 710/26 |
| 2010/0332777 A1* | 12/2010 | Tsai | G06F 11/1456 |
| | | | 711/E12.001 |
| 2011/0022744 A1* | 1/2011 | Sun | G06F 3/0611 |
| | | | 710/51 |
| 2012/0079177 A1* | 3/2012 | Brewer | G06F 12/0607 |
| | | | 711/127 |
| 2014/0122753 A1* | 5/2014 | Chiu | G06F 3/0604 |
| | | | 710/74 |
| 2014/0164689 A1 | 6/2014 | Chun et al. | |
| 2018/0150220 A1* | 5/2018 | Pandian | G06F 3/0659 |
| 2021/0081312 A1 | 3/2021 | Coury et al. | |

OTHER PUBLICATIONS

EPO European Extended Search Report in EP Application Serial No. 22201897.0 mailed on May 23, 2023, 10 pages.

EPO Communication Pursuant to Article 94(3) EPC in EP Application Serial No. 22201897.0 mailed on Oct. 4, 2024, 5 pages.

EPO Communication under Rule 71(3) EPC issued in Application No. 22201897.0, mailed May 22, 2025; 7 pages.

* cited by examiner

INTERLEAVING OF HETEROGENEOUS MEMORY TARGETS

FIELD

The present disclosure relates in general to the field of computer development, and more specifically, to interleaving of heterogeneous memory targets.

BACKGROUND

A computing system may include a plurality of memory targets. Entities such as an operating system or applications may generate memory requests to be performed by the various memory targets.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

A trend of increasing per-socket core counts (e.g., in server System-on-Chips (SoCs)) provides motivation for a corresponding increase in higher memory bandwidth to support the higher core counts. Thus, some systems now include multiple memory types usable by cores, such as native Double Data Rate 5 (DDR5) memory with multiple channels as well as other memory such as Compute Express Link (CXL) Type 3 memory (which may, e.g., be volatile & persistent), High Bandwidth Memory (HBM), or other memory types. Increasing the number of native memory channels (e.g., channels from an integrated memory controller to DDR memory) may run into limitations such as platform technical feasibility and cost and power challenges, thus these additional memory types may improve the memory bandwidth in a viable manner.

In some computing systems, memory may be interleaved in order to spread memory accesses evenly across multiple memory targets to achieve improved performance due to parallelism. The memory accesses may be distributed across the interleaved memory targets, e.g., in a round robin fashion. The addresses used to write to the interleaved memory targets may be unique, such that there is no aliasing of memory addresses between multiple memory targets. In some systems, when heterogenous memory target types (e.g., DDR5, CXL, HBM, etc.) are present, the different memory targets may be interleaved separately (such that memory targets of a particular type may provide a first address space and memory targets of another type may provide a second address space). Thus, separate memory ranges per memory target type may be configured by a Basic Input/Output System (BIOS) and individually exposed to an operating system (OS), virtual machine manager (VMM), or other software applications. Thus, separate memory types may be configured by BIOS as distinct address ranges.

As one example of such a system, a tiered memory approach may be used in which an SoC comprises eight DDR5 channels (to a first memory target type) and four CXL ports (to a second memory target type). System firmware (e.g., BIOS) may configure two tiers of memory resources: a first address range interleaved across the eight DDR5 channels and a second address range interleaved across the four CXL ports. An OS or VMM may then schedule applications to use either the first or second address range. Since the available memory resources are tiered/separated into different buckets/ranges, applications using the first memory range (e.g., DDR5 channels 0-7) cannot exploit the additional bandwidth opportunity offered by another memory range (e.g., CXL ports 0-3). Such tiered memory approaches may not be suitable for applications requiring high amounts of memory bandwidth. Moreover, additional burden may be placed on the OS/VMM to properly schedule applications on different memory ranges based on application characteristics and bandwidth needs.

Various embodiments of the present disclosure provide methods to achieve bandwidth expansion by interleaving heterogeneous memory targets (e.g., DDR5 attached to an integrated memory controller, memory attached through CXL, HBM, etc.) into a single continuous software visible address range available to the OS, VMM, and/or applications. Bandwidth expansion is achieved by allowing applications to take advantage of the full memory bandwidth offered by the different memory targets within that address range. In one embodiment, a heterogeneous address range targeting both internal memory controller channels (e.g., DDR5 targets) and CXL memory buffers (e.g., CXL targets) is configured by system BIOS and exposed to software.

Various embodiments may also simplify OS or VMM scheduling as applications can be uniformly scheduled in the address range of the heterogeneous interleaved memory. In some embodiments, the OS or VMM may schedule bandwidth intensive applications to use one or more heterogeneous interleaved memory ranges and other applications to use one or more other memory ranges that are not heterogeneous interleaved memory ranges.

Figure 1:
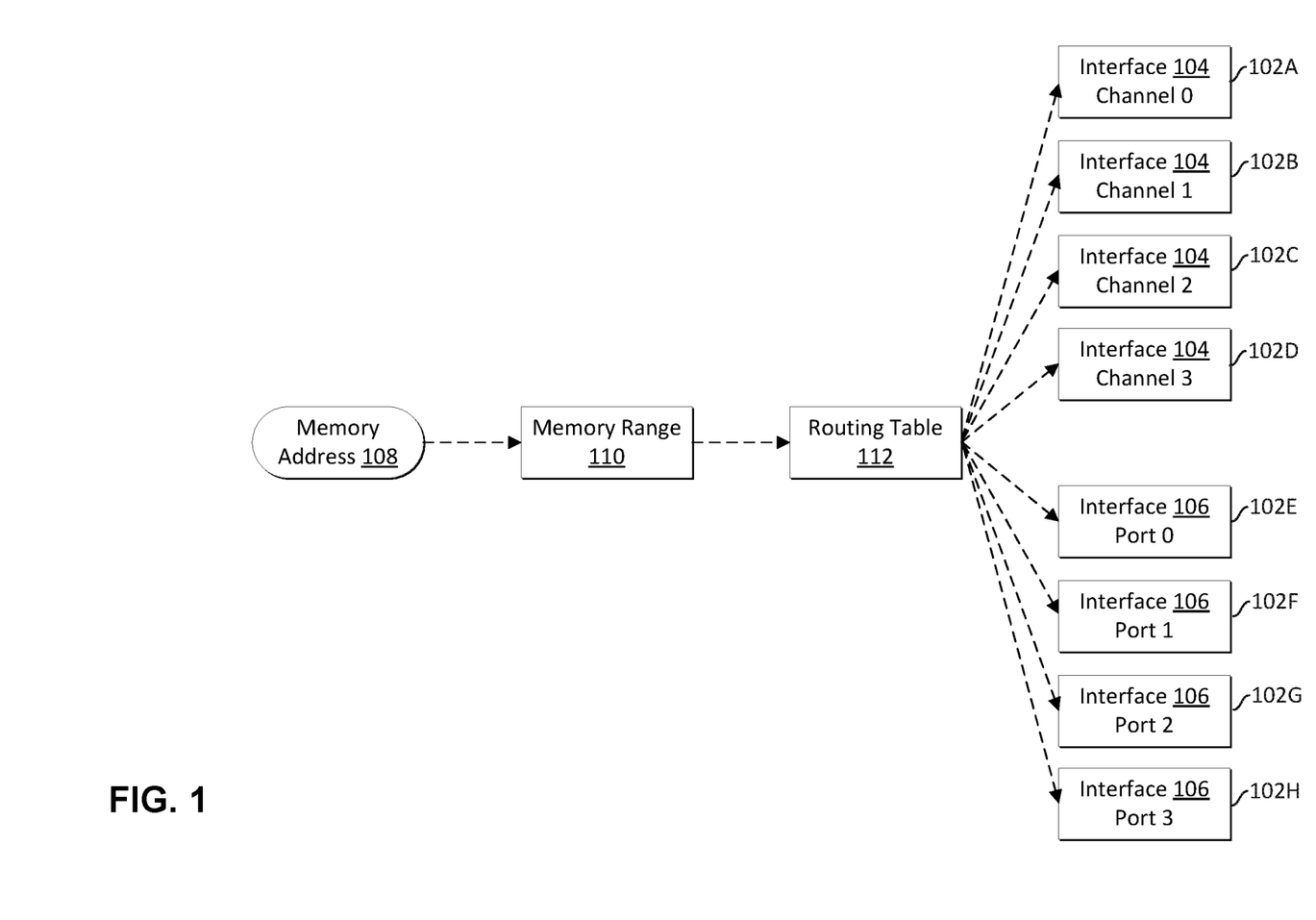
FIG. 1 illustrates interleaving of heterogeneous memory targets in accordance with certain embodiments.

FIG. 1 illustrates interleaving of heterogeneous memory targets 102 (e.g., 102A-102H) in accordance with certain embodiments. In this embodiment, a first group of memory targets of a first type (coupled to various channels of interface 104) and a second group of memory targets of a second type (coupled to various ports of interface 106) are interleaved together into a single address space. A memory address provided by a requesting entity (e.g., a core executing instructions for a software entity) may be determined to be within a memory range 110 corresponding to a routing table 112. The routing table 112 may route a request referencing the memory address to one of the memory targets 102 based on the memory address 108.

Heterogeneous memory targets may be memory targets that differ in one or more aspects, such as performance characteristics (e.g., bandwidth, latency), underlying storage technology type (e.g., NAND flash, persistent memory (PMEM) such as 3D crosspoint, dynamic random access memory (DRAM), etc.), or transport mechanism and/or interface to the memory target (e.g., a memory bus to an integrated memory controller that is coupled to memory through a socket, a CXL bus to one or more CXL ports, a PCIe bus to one or more PCIe ports, an interposer to a logic die for HBM memory, etc.).

In various embodiments, memory requests may take different routes through different subsystems to the heterogeneous memory targets. In the embodiment depicted, memory requests for memory targets coupled to interface 104 may be routed through a first path, while memory requests for memory targets coupled to interface 106 may be routed through a second path (where the memory targets coupled to interface 104 are considered heterogeneous to the memory targets coupled to interface 106).

When the heterogeneous memory targets have varying characteristics, the system memory performance may be affected. For example, the latency of memory accesses to a heterogeneous interleaved memory may be a weighted average of the latencies of the different memory types (with the weights corresponding to the number of devices of each memory type). In some embodiments, each memory device that is used as a memory target has the same capacity. In various embodiments, if a particular memory device is larger than other memory devices used in the heterogeneous interleaving, then only a portion of that memory device is used in the heterogeneous interleaving, and any spare capacity may be used in a separate address space or may be unused. In one example, if a plurality of heterogeneous memory devices have varying capacities, the capacity of the memory device with the smallest capacity (or some smaller capacity) may be used as the capacity for each memory device that is interleaved.

Interleaved memory targets may improve the bandwidth of a system memory by spreading memory addresses evenly across a plurality of memory targets. In this manner, memory reads and writes for contiguous addresses may use the memory targets in turn, resulting in higher memory throughput due to reduced waiting for memory targets to perform subsequent commands. An interleaved memory is said to be n-way interleaved when there are n memory targets.

As just one example, in an heterogenous interleaved memory with four memory targets (a 4-way interleaved system), logical address 0 may be routed to a first memory target, logical address 1 may be routed to a second memory target, logical address 2 may be routed to a third memory target, logical address 3 may be routed to a fourth memory target, logical address 4 may be routed to the first memory target, logical address 5 may be routed to the second memory target, and so on. In this example, two bits of the logical address could be used to route the memory request to the appropriate memory target. Each logical address may refer to a portion of memory having a size that is referred to as the interleave granularity. As just one example, the interleave granularity may be 256 bytes.

In some embodiments, a computing system may comprise one or more heterogeneous interleaved memories. A heterogeneous interleaved memory may comprise one or more memory targets of a first type (e.g., DDR5 memory devices coupled to an internal memory controller) and one or more memory targets of a second type (e.g., memory devices coupled to one or more CXL bridges). Some heterogeneous interleaved memories may also comprise one or more memory targets of one or more additional types as well.

When a computing system comprises multiple heterogeneous interleaved memories, each heterogeneous interleaved memory may comprise a distinct address space and may be associated with a separate routing table 112. Memory requests for a particular heterogeneous interleaved memory may be routed through the associated routing table 112. In various embodiments, a computing system may comprise one or more heterogeneous interleaved memories as well as one or more other non-heterogeneous interleaved memories.

Figure 2:
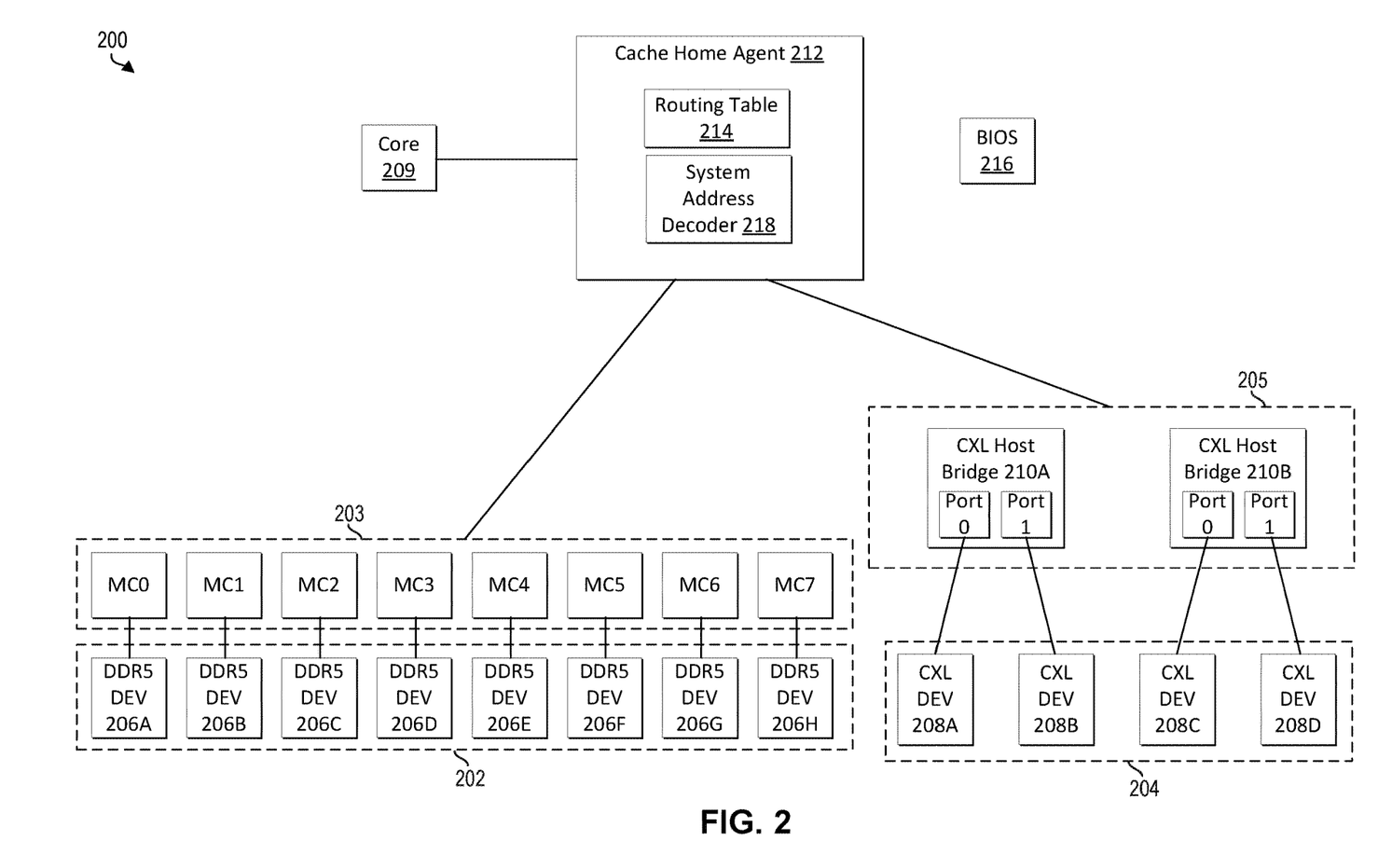
FIG. 2 illustrates components of a computer system with interleaved memory in accordance with certain embodiments.

FIG. 2 illustrates components of a computer system 200 with heterogeneous interleaved memory targets 202 and 204 in accordance with certain embodiments. System 200 includes a first type of memory targets 202 and a second type of memory targets 204. The first type of memory targets includes a plurality of DDR5 memory devices 206 (e.g., 206A-H) and the second type of memory targets includes a plurality of CXL memory devices 208 (e.g., 208A-D) (e.g., memory devices to communicate using a CXL protocol). The first type of memory targets 202 are reachable through a first interface 203, which may comprise an integrated memory controller. The second type of memory targets 204 are reachable through a second interface 205, which may comprise two CXL host bridges 210 comprising CXL ports (shown as ports 0 and ports 1).

The DDR5 memory devices 206 may be coupled through respective channels to an integrated memory controller comprising individual memory controllers MC0-MC7. In various embodiments, this memory controller may be integrated on the same die and/or package as the core 209. In one embodiment, each DDR5 memory device 206 is a dual in-line memory module (DIMM) that couples to a DDR5 bus of a processor. In other embodiments, the memory devices 206 may be any other type of memory (such as different DDR memory or other suitable memory).

The CXL memory devices 208 may be coupled to CXL ports of CXL host bridges 210 (e.g., 210A and 210B). The CXL memory devices may be, e.g., Type 3 CXL memory devices and the memory (e.g., DDR5, persistent memory, or other suitable type of memory) of the devices 208 may be coherent with the memory of the DDR5 memory devices 206. In some embodiments, the CXL host bridges 210 may be integrated on the same die or package as the core. In various embodiments, a CXL memory device 208 may be a memory card with one or more memory modules and the CXL memory device 208 may attach to a CXL bus of a processor.

Although a particular arrangement of heterogeneous interleaved memory is depicted, in other embodiments, any suitable configuration may be utilized to couple heterogeneous interleaved memory to one or more cores or other processor units.

Core 209 may include a processor core that executes software instructions (e.g., of an OS, VMM, or an application managed by an OS or VMM) or other logical entity to generate memory requests. Core 209 may issue memory requests to read from or write to the heterogeneous interleaved memory. A memory request may specify a logical address of memory. In some embodiments, the request also includes or is otherwise associated with an identifier (ID) of a cache home agent 212 to which the memory request should be routed. In some embodiments, the cache home agent ID may be generated by hashing at least a portion of the memory address. In various embodiments, the request may also include or otherwise be associated with a cluster ID. For example, a processor may include a plurality of clusters that each include one or more cache home agents for a cluster of cores and the cluster ID may be used in conjunction with the cache home agent ID to route the memory request to the appropriate cache home agent 212.

A cache home agent 212 manages memory requests for a group of memory devices. A cache home agent 212 may be responsible for processing memory requests involving the memory devices and may act as a home for at least a part of a memory address space (e.g., one processor may have multiple homes in a distributed address space mapping). In some instances, a cache home agent 212 may supervise a portion of coherent memory. As such, the cache home agent 212 may manage conflicts that arise among different cores accessing the memory space assigned to the cache home agent 212. The cache home agent 212 may provide the appropriate data and ownership responses in accordance with a given transaction's flow.

A cache home agent 212 may comprise one or more routing tables 214. A routing table may comprise a plurality of entries with an entry mapping a logical memory address to routing information for the logical memory address. The entries and/or associated information of a routing table 214 may be programmed by firmware of the computing system (e.g., BIOS 216). In the embodiment depicted, a cache home agent 212 include a routing table 214 for the address space of the heterogeneous interleaved memory. In some examples, a cache home agent 212 may also include one or more additional routing tables for one or more other address spaces (e.g., for memory of devices 206 or 208 that is not used for the heterogeneous interleaved memory).

As described above, in some embodiments, a cache home agent 212 may comprise multiple routing tables 214. For example, one routing table may be utilized for a first heterogeneous interleaved memory and another routing table may be utilized for a second heterogeneous interleaved memory (e.g., that utilizes different memory devices than the first heterogeneous interleaved memory). In some embodiments, multiple different interleaved memories may have different parameters (e.g., interleave granularity) and thus may utilize separate routing tables. As another example, one routing table may be utilized for a heterogeneous interleaved memory and another routing table may be utilized for an interleaved memory that is not heterogeneous. For example, the interleaved memory that is not heterogeneous could be an interleaved memory among portions of the DDR5 memory devices 206 (or other memory devices connected to the integrated memory controller) that are not used in the heterogeneous interleaved memory, while the heterogeneous interleaved memory may be interleaved among DDR5 memory devices 206 and CXL memory devices 208.

In various embodiments, BIOS 216 may configure the computing system 200 to use the heterogeneous interleaved memory. For example, BIOS 216 may examine (e.g., during bootup of the computing system 200) attributes of various memory devices to determine their suitability for inclusion within a heterogeneous interleaved memory. In some embodiments, CXL memory devices 208 publish their device performance characteristics via a Coherent Device Attribute Table table during enumeration, hence the BIOS 216 can determine the suitability of the CXL memory devices to be interleaved in a heterogeneous fashion (e.g., with CPU direct attached DDR memory). BIOS 216 may perform other configuration operations, such as select a plurality of the memory devices to be used as targets, determine an amount of memory of each memory device to be used in the heterogeneous interleaved memory, select a granularity for the heterogeneous interleaved memory, configure (e.g., by writing to registers) the entries of routing table 214 or other decode elements (e.g., in memory controllers (e.g., MC0-MC7) or CXL host bridges 210), program the system address decoder 218 of cache home agent 212 with information specifying which bits of the system address should be used to index into the routing table 214, or other suitable configuration operations.

In some embodiments, the memory channel bandwidth on each memory channel of the different target types (e.g., DDR5, CXL, etc.) is required (e.g., by the BIOS 216) to be within a particular tolerance (e.g., within +−25% of each other) for inclusion in the heterogeneous interleaved memory (e.g., in order to avoid any system glass-jaws). Similarly, the latency on each memory channel of the different target types could be required to be within a particular tolerance. Thus, in some embodiments, BIOS 216 may prevent memory that varies wildly in terms of bandwidth or latency from being used together in a heterogeneous interleaved memory.

The address decode flow used has two key portions, a CPU internal address decode and a memory side decode. The CPU internal address decode may include determining the homed location (e.g., the appropriate cache home agent 212) of the memory in the system address map (e.g., via Cluster ID/CHA decode performed on the memory address of the memory request). An incoming logical memory address of a memory request is then decoded for the target location of the heterogeneous interleaved memory by a system address decoder 218 to determine which type of memory (e.g., direct attached DDR or CXL in the depicted example) the memory address maps to. Based on the target (and information in the routing table 214), the internal fabric of the computing system 200 routes the memory request to the appropriate interface and port/channel of the target memory type (e.g., MC0, . . . , MC7, CXL host bridge 210A or 210B).

The recipient memory component (e.g., either an MC0-7 of the integrated memory controller or a CXL memory device 208) may be programmed (e.g., by the BIOS 216) with information about interleave ways (e.g., how many memory targets are being interleaved, which is 12 in this example) and interleave granularity (e.g., the amount of data that is written to a particular memory target before the next memory target is written to during interleaving). During the memory side decode, based on this information, the memory component may translate a logical address received in a memory request to a device physical address (DPA). In some embodiments, the memory component performs this translation by removing particular bits of the logical address based on the number of interleave ways and the interleave granularity. In some embodiments, the memory component may further decode the DPA into address components such as a physical memory channel, rank, bank, etc.

The BIOS 216 and/or other system firmware components may be responsible for consistent programming across CPU components such as the system address decoder 218, target address decoders (e.g., in the memory controllers MC0-MC7 and the CXL memory devices 208) to translate logical addresses to physical addresses, CXL memory device Host-managed Device Memory (HDM) decoders, or other suitable components. For example, the BIOS 216 may program such components with any information needed (e.g., number of ways, interleave granularity) to correctly translate logical addresses to physical addresses.

Figure 3:
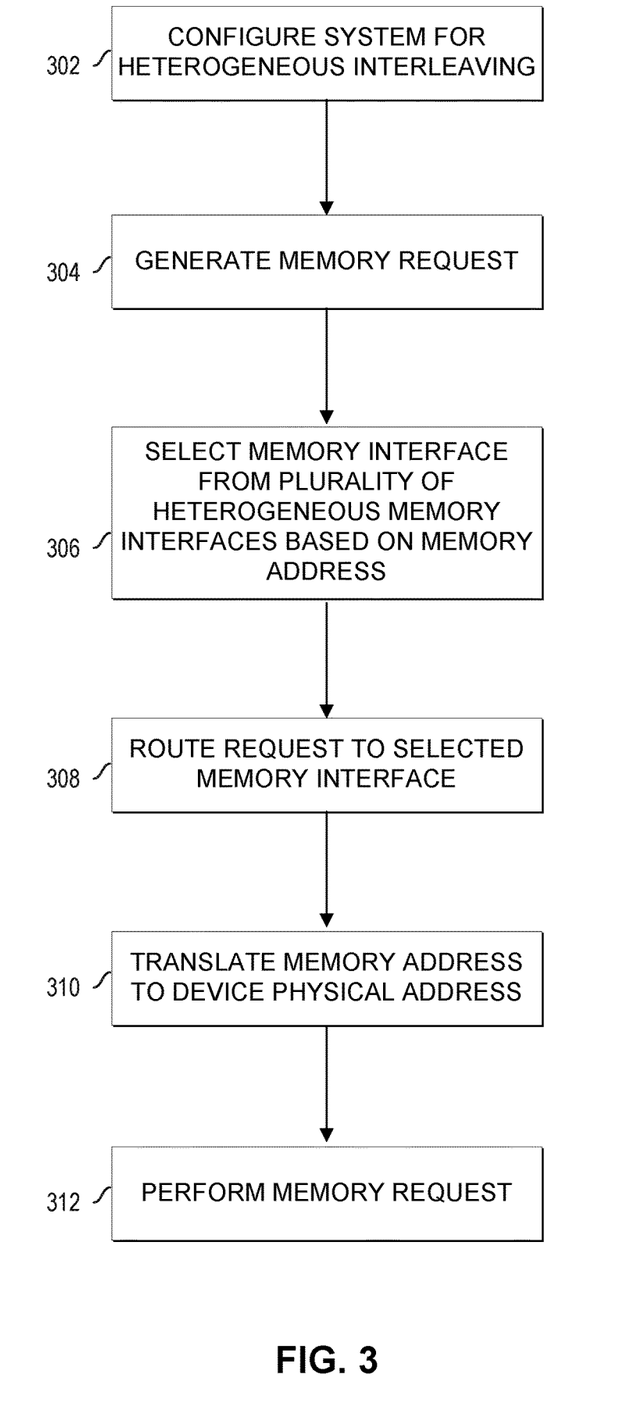
FIG. 3 illustrates a flow for routing a memory request in a heterogeneous interleaved memory in accordance with certain embodiments.

FIG. 3 illustrates a flow for routing a memory request in a heterogeneous interleaved memory in accordance with certain embodiments. At 302, a computing system may be configured for heterogeneous interleaving. For example, firmware or other logic of a computing system may detect memory devices and set up an interleaving scheme by programming the computing system based on the memory devices to be used for the interleaving.

At 304, a memory request is generated (e.g., by a processor core or other suitable processing unit). At 306, a memory interface is selected from a plurality of heterogeneous memory interfaces based on a memory address of the memory request. At 308, the memory request is routed to the selected memory interface. At 310, a memory component coupled to the selected memory interface translates the memory address into a device physical address and directs the request to the appropriate memory device for performance of the request at 312.

Figure 4:
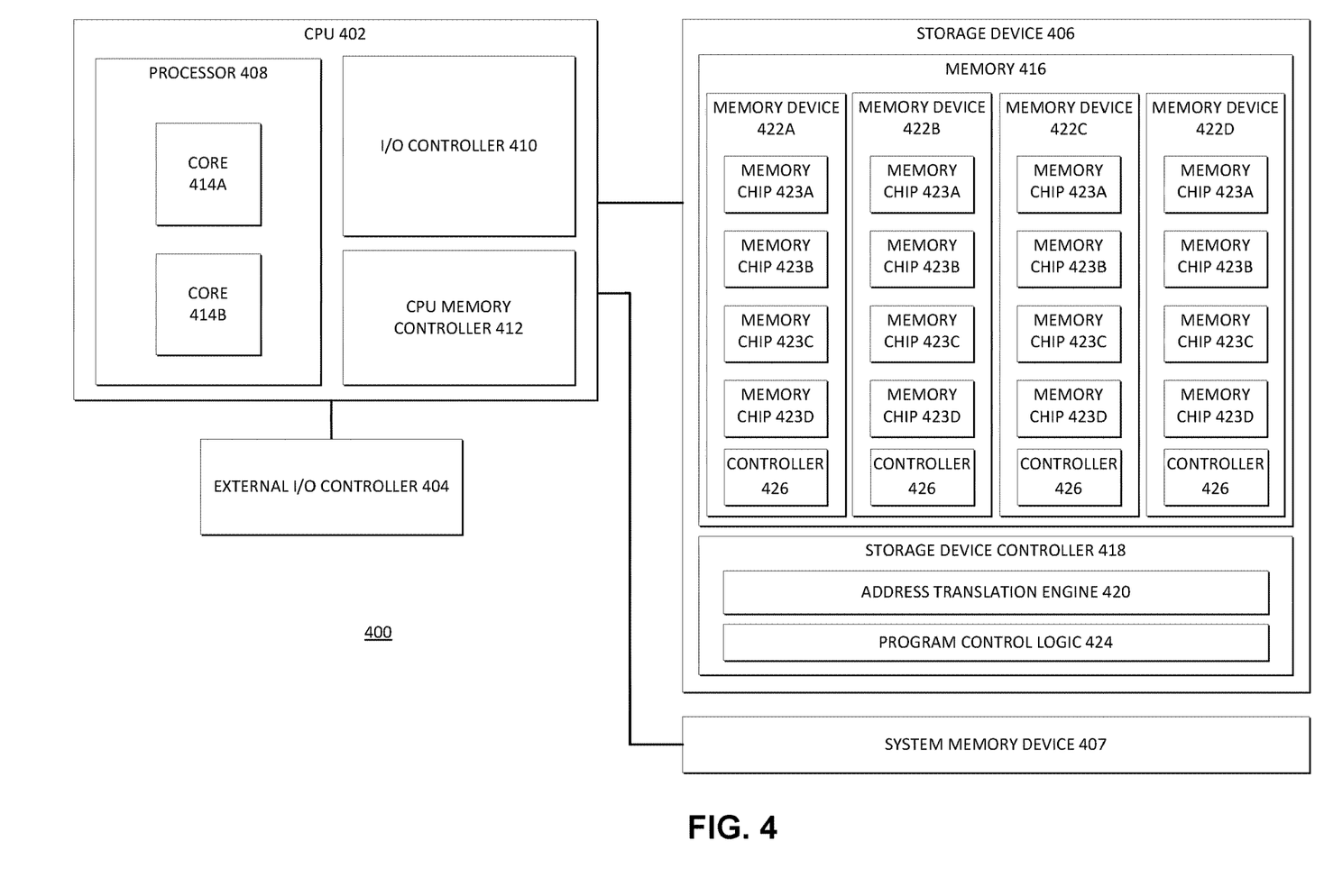
FIG. 4 illustrates components of a computer system in accordance with certain embodiments.

FIG. 4 illustrates a block diagram of components of a computer system 400 in accordance with certain embodiments. Various aspects of the present disclosure may be implemented by system 400. For example, core 209 may correspond to a core 414, interfaces 104, 106, 203, or 205 may be part of the CPU 402 (e.g., interface 104 or 203 may correspond to at least a portion of CPU memory controller 412), a heterogeneous interleaved memory may function as a system memory 407, the cache home agent 212 may be a part of CPU 402, or any of the memory targets of the heterogeneous interleaved memory may be implemented by any of the types of memories described in connection with storage device 406 or system memory device 407.

System 400 includes a central processing unit (CPU) 402 coupled to an external input/output (I/O) controller 404, storage device 406, and system memory device 407. During operation, data may be transferred between storage device 406 or system memory device 407 and the CPU 402. In various embodiments, particular data operations (e.g., erase, program, and read operations) involving a storage device 406 or system memory device 407 may be managed by an operating system or other software application executed by processor 408.

CPU 402 comprises a processor 408, such as a microprocessor, an embedded processor, a digital signal processor (DSP), a network processor, a handheld processor, an application processor, a co-processor, a system on a chip (SOC), or other device to execute code (i.e., software instructions). Processor 408, in the depicted embodiment, includes two processing elements (cores 414A and 414B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 414 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 410 is an integrated I/O controller that includes logic for communicating data between CPU 402 and I/O devices, which may refer to any suitable devices capable of transferring data to and/or receiving data from an electronic system, such as CPU 402. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input devices such as a monitor, printer, mouse, keyboard, or scanner; or other suitable device. In a particular embodiment, an I/O device may comprise a storage device 406 that may be coupled to the CPU 402 through I/O controller 410.

An I/O device may communicate with the I/O controller 410 of the CPU 402 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 410 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 402) or may be integrated on the same chip as the CPU 402.

CPU memory controller 412 is an integrated memory controller that includes logic to control the flow of data going to and from one or more system memory devices 407. CPU memory controller 412 may include logic operable to read from a system memory device 407, write to a system memory device 407, or to request other operations from a system memory device 407. In various embodiments, CPU memory controller 412 may receive write requests from cores 414 and/or I/O controller 410 and may provide data specified in these requests to a system memory device 407 for storage therein. CPU memory controller 412 may also read data from a system memory device 407 and provide the read data to I/O controller 410 or a core 414. During operation, CPU memory controller 412 may issue commands including one or more addresses of the system memory device 407 in order to read data from or write data to memory (or to perform other operations). In some embodiments, CPU memory controller 412 may be implemented on the same chip as CPU 402, whereas in other embodiments, CPU memory controller 412 may be implemented on a different chip than that of CPU 402. I/O controller 410 may perform similar operations with respect to one or more storage devices 406.

The CPU 402 may also be coupled to one or more other I/O devices through external I/O controller 404. In a particular embodiment, external I/O controller 404 may couple a storage device 406 to the CPU 402. External I/O controller 404 may include logic to manage the flow of data between one or more CPUs 402 and I/O devices. In particular embodiments, external I/O controller 404 is located on a motherboard along with the CPU 402. The external I/O controller 404 may exchange information with components of CPU 402 using point-to-point or other interfaces.

A system memory device 407 may store any suitable data, such as data used by processor 408 to provide the functionality of computer system 400. For example, data associated with programs that are executed or files accessed by cores 414 may be stored in system memory device 407. Thus, a system memory device 407 may include a system memory that stores data and/or sequences of instructions that are executed or otherwise used by the cores 414. In various embodiments, a system memory device 407 may store persistent data (e.g., a user's files or instruction sequences) that remains stored even after power to the system memory device 407 is removed. A system memory device 407 may be dedicated to a particular CPU 402 or shared with other devices (e.g., one or more other processors or other devices) of computer system 400.

In various embodiments, a system memory device 407 may include a memory comprising any number of memory arrays, a memory device controller, and other supporting logic (not shown). A memory array may include non-volatile memory and/or volatile memory. Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as dynamic random-access memory (DRAM) or static random-access memory (SRAM). One particular type of DRAM that may be used in a memory array is synchronous dynamic random-access memory (SDRAM). In some embodiments, any portion of system memory device 407 that is volatile memory can comply with JEDEC standards including but not limited to Double Data Rate (DDR) standards, e.g., DDR3, 4, and 5, or Low Power DDR4 (LPDDR4) as well as emerging standards.

A storage device 406 may store any suitable data, such as data used by processor 408 to provide functionality of computer system 400. For example, data associated with programs that are executed or files accessed by cores 414A and 414B may be stored in storage device 406. Thus, in some embodiments, a storage device 406 may store data and/or sequences of instructions that are executed or otherwise used by the cores 414A and 414B. In various embodiments, a storage device 406 may store persistent data (e.g., a user's files or software application code) that remains stored even after power to the storage device 406 is removed. A storage device 406 may be dedicated to CPU 402 or shared with other devices (e.g., another CPU or other device) of computer system 400.

In the embodiment depicted, storage device 406 includes a storage device controller 418 and a memory 416 comprising four memory devices 422A-D operable to store data, however, a storage device may include any suitable number of memory devices. A memory device 422A includes a plurality of memory cells that are each operable to store one or more bits. The cells of a memory device 422A may be arranged in any suitable fashion, such as in rows (e.g., wordlines) and columns (e.g., bitlines), three dimensional structures, and/or other manner. In various embodiments, the cells may be logically grouped into banks, blocks, sub-blocks, planes, wordlines, pages, frames, bytes, or other suitable groups. In various embodiments, a memory device 422A comprises one or more NAND flash memory arrays.

A memory device 422A may include any of the volatile or non-volatile memories listed above or other suitable memory. In particular embodiments, memory device 422A includes non-volatile memory, such as planar or 3D NAND flash memory. In particular embodiments, a memory device 422A with non-volatile memory may comply with one or more standards for non-volatile memory promulgated by the Joint Electron Device Engineering Council (JEDEC), such as JESD218, JESD219, JESD220-1, JESD220C, JESD223C, JESD223-1, or other suitable standard (the JEDEC standards cited herein are available at www.jedec.org). In particular embodiments, the storage device comprises NAND flash memory that complies with one or more portions of a standard promulgated by JEDEC for SDRAM memory, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices that implement such standards may be referred to as DDR-based interfaces. For example, a storage device 406 comprising NAND flash memory may receive a command that has a format compliant with a DDR-based standard and may translate the command into one or more commands that are compatible with NAND flash memory of the storage device 406. Similarly, the storage device 406 may format results from operations performed on the NAND flash memory into a format that is compliant with a DDR-based standard before transmitting the results to the CPU 402.

In a particular embodiment, a memory device 422 is a semiconductor package. In various embodiments, a semiconductor package may comprise a casing comprising one or more semiconductor dies (also referred to as chips) (e.g., memory chips 423A-D). A package may also comprise contact pins or leads used to connect to external circuits. However, a package is merely one example form a memory device 422 may take as a memory device may be any suitable arrangement of one or more memory arrays and associated logic in any suitable physical arrangement. For example, although a single physical package may include a single memory device 422, multiple memory devices 422 could be resident on a single package or a memory 422 could be spread across multiple packages.

A memory 416 may be embodied in one or more different physical mediums, such as a circuit board, die, disk drive, other medium, or any combination thereof (or combination with one or more packages). In a particular embodiment, memory 416 comprises a circuit board coupled to a plurality of memory devices 422 that each comprise a semiconductor package.

Storage device 406 may comprise any suitable type of memory and is not limited to a particular speed, technology, or form factor of memory in various embodiments. For example, a storage device 406 may be a disk drive (such as a solid-state drive), a flash drive, memory integrated with a computing device (e.g., memory integrated on a circuit board of the computing device), a memory module (e.g., a dual in-line memory module) that may be inserted in a memory socket, or other type of storage device. Moreover, computer system 400 may include multiple different types of storage devices. Storage device 406 may include any suitable interface to communicate with CPU memory controller 412 or I/O controller 410 using any suitable communication protocol such as a DDR-based protocol, PCI, PCIe, USB, SAS, SATA, FC, System Management Bus (SMBus), or other suitable protocol. A storage device 406 may also include a communication interface to communicate with CPU memory controller 412 or I/O controller 410 in accordance with any suitable logical device interface specification such as NVMe, AHCI, or other suitable specification. In particular embodiments, storage device 406 may comprise multiple communication interfaces that each communicate using a separate protocol with CPU memory controller 412 and/or I/O controller 410.

Storage device controller 418 may include logic to receive requests from CPU 402 (e.g., via CPU memory controller 412 or I/O controller 410), cause the requests to be carried out with respect to a memory 416 (or memory devices(s) and/or memory chip(s) thereof), and provide data associated with the requests to CPU 402 (e.g., via CPU memory controller 412 or I/O controller 410). Controller 418 may also be operable to detect and/or correct errors encountered during memory operation. In an embodiment, controller 418 also tracks the number of times particular cells (or logical groupings of cells) have been written to in order to perform wear leveling and/or to detect when cells are nearing an estimated number of times they may be reliably written to. In performing wear leveling, the storage device controller 418 may evenly spread out write operations among blocks of the memory of a memory 416 such that particular blocks are not written to more than other blocks. In various embodiments, controller 418 may also monitor various characteristics of the storage device 406 such as the temperature or voltage and report associated statistics to the CPU 402. Storage device controller 418 can be implemented on the same circuit board or device as a memory 416 or on a different circuit board, or device. For example, in some environments, storage device controller 418 may be a centralized storage controller that manages memory operations for multiple different memories 416 (which may each be of the same type of memory or may be of different types) of computer system 400 (and thus may provide storage device controller functionality described herein to any of the memories to which it is coupled).

In various embodiments, the storage device 406 also includes an address translation engine 420. In the depicted embodiment, the address translation engine 420 is shown as part of the storage device controller 418, although in various embodiments, the address translation engine 420 may be separate from the storage device controller 418 and communicably coupled to the storage device controller 418. In various embodiments, the address translation engine 420 may be integrated on the same chip or package as the storage device controller 418 or on a different chip or package.

In various embodiments, address translation engine 420 may include logic to store and update a mapping between a logical address space (e.g., an address space visible to a host computing device coupled to the storage device 406) and the physical address space of the memory 416 of the storage device 406 (which may or may not be exposed to the host computing device). The logical address space may expose a plurality of logical groups of data which are physically stored on corresponding physical groups of memory addressable through the physical address space of the storage device 406. A physical address of the physical address space may comprise any suitable information identifying a physical memory location (e.g., a location within a memory array of a memory 416) of the storage device 406, such as an identifier of the memory 416 on which the physical memory location is located, an identifier of the memory device 422A on which the physical memory location is located, one or more pages of the physical memory location, one or more subblocks of the physical memory location, one or more wordlines of the physical memory location, one or more bitlines of the physical memory location, or other suitable identifiers or encodings thereof.

In various embodiments, the storage device 406 also includes program control logic 424 which alone or in combination with a memory device controller 426 is operable to control the programming sequence performed when data is written to a memory 416, the read sequence performed when data is read from a memory 416, or an erase sequence when data is erased from a memory 416. In various embodiments, program control logic 424 may provide the various voltages (or information indicating which voltages should be provided) that are applied to one or more memory cells, wordlines, bitlines, and/or other portions of a memory array during the programming, reading, and/or erasing of data, perform error correction, and perform other suitable functions.

In various embodiments, the program control logic 424 may be integrated on the same chip as the storage device controller 418 or on a different chip. In the depicted embodiment, the program control logic 424 is shown as part of the storage device controller 418, although in various embodiments, all or a portion of the program control logic 424 may be separate from the storage device controller 418 and communicably coupled to the storage device controller 418. For example, all or a portion of the program control logic 424 may be located on the same package or chip as a memory 416 and/or memory devices 422A-D.

In some embodiments, all, or some of the elements of system 400 are resident on (or coupled to) the same circuit board (e.g., a motherboard). In various embodiments, any suitable partitioning between the elements may exist. For example, the elements depicted in CPU 402 may be located on a single die (i.e., on-chip) or package or any of the elements of CPU 402 may be located off-chip or off-package. Similarly, the elements depicted in storage device 406 may be located on a single chip or on multiple chips. In various embodiments, a storage device 406 and a host computing device (e.g., CPU 402) may be located on the same circuit board or on the same device and in other embodiments the storage device 406 and the host computing device may be located on different circuit boards or devices.

The components of system 400 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, and a Gunning transceiver logic (GTL) bus. In various embodiments, an integrated I/O subsystem includes point-to-point multiplexing logic between various components of system 400, such as cores 414, one or more CPU memory controllers 412, I/O controller 410, integrated I/O devices, direct memory access (DMA) logic (not shown), etc. In various embodiments, components of computer system 400 may be coupled together through one or more networks comprising any number of intervening network nodes, such as routers, switches, or other computing devices. For example, a host computing device (e.g., CPU 402) and the storage device 406 may be communicably coupled through a network.

Although not depicted, system 400 may use a battery and/or power supply outlet connector and associated system to receive power, a display to output data provided by CPU 402, or a network interface allowing the CPU 402 to communicate over a network. In various embodiments, the battery, power supply outlet connector, display, and/or network interface may be communicatively coupled to CPU 402. Other sources of power can be used such as renewable energy (e.g., solar power or motion based power).

Figure 5:
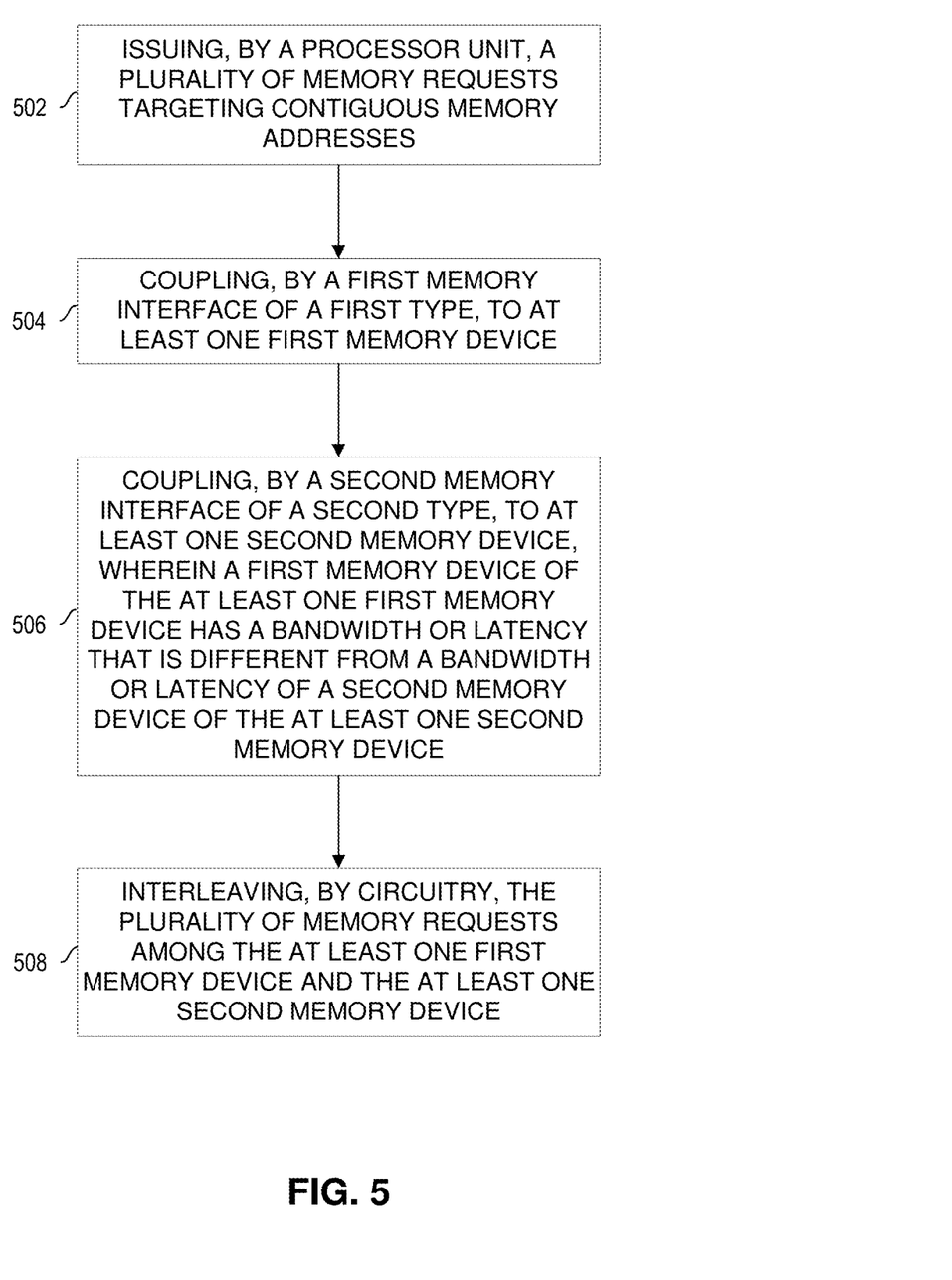
FIG. 5 illustrates a flow for interleaving a plurality of memory requests among at least one first memory device and at least one second memory device in accordance with certain embodiments.

FIG. 5 illustrates a flow for interleaving a plurality of memory requests among at least one first memory device and at least one second memory device in accordance with certain embodiments. At 502, a processor unit issues a plurality of memory requests targeting contiguous memory addresses. At 504, a first memory interface of a first type couples to at least one first memory device. At 506, a second memory interface of a second type to couple to at least one second memory device, wherein a first memory device of the at least one first memory device has a bandwidth or latency that is different from a bandwidth or latency of a second memory device of the at least one second memory device. At 508, circuitry interleaves the plurality of memory requests among the at least one first memory device and the at least one second memory device.

The flows described herein are merely representative of operations that may occur in particular embodiments. Some of the operations illustrated in the FIGs. may be repeated, combined, modified, or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable storage medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as routing table 112, interface 104, interface 106, core 209, cache home agent 212, BIOS 216, memory controllers (MC0-7), DDR5 memory devices 206, CXL memory devices 208, CXL host bridges 210, CPU 402, external I/O controller 404, processor 408, cores 414A and 414B, I/O controller 410, CPU memory controller 412, storage device 406, system memory device 407, memory chip 416, storage device controller 418, address translation engine 420, memory partition 422, program control logic 424, chip controller 426, or other entity or component described herein, or subcomponents of any of these. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g. reset, while an updated value potentially includes a low logical value, e.g. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (e.g., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a The machine-readable storage medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage medium used in the transmission of information over the Internet via electrical, optical, acoustical or other forms of propagated signals (e.g., carrier waves, infrared signals, digital signals, etc.). Accordingly, the computer-readable medium includes any type of tangible machine-readable storage medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes a processor comprising a first memory interface of a first type to couple to at least one first memory device; a second memory interface of a second type to couple to at least one second memory device; and circuitry to interleave memory requests targeting contiguous logical memory addresses among the at least one first memory device and the at least one second memory device.

Example 2 includes the subject matter of Example 1, and wherein the first memory interface comprises an integrated memory controller.

Example 3 includes the subject matter of any of Examples 1 and 2, and wherein the second memory interface comprises a Compute Express Link (CXL) interface.

Example 4 includes the subject matter of any of Examples 1-3, and wherein the at least one first memory device comprises a plurality of double data rate (DDR) memory devices and wherein the at least one second memory device comprises a plurality of CXL memory devices.

Example 5 includes the subject matter of any of Examples 1-4, and wherein the circuitry to interleave memory requests comprises a routing table comprising entries mapping logical memory addresses to the first and second memory interfaces.

Example 6 includes the subject matter of any of Examples 1-5, and further including second circuitry to configure the circuitry to interleave memory requests.

Example 7 includes the subject matter of any of Examples 1-6, and wherein the second circuitry implements a basic input/output system (BIOS).

Example 8 includes the subject matter of any of Examples 1-7, and wherein the second circuitry is to analyze parameters of the at least one first memory device and the at least one second memory device and determine suitability of the at least one first memory device and the at least one second memory device for interleaving based on the parameters.

Example 9 includes the subject matter of any of Examples 1-8, and wherein the parameters include channel bandwidths of the at least one first memory device and the at least one second memory device.

Example 10 includes the subject matter of any of Examples 1-9, and wherein the parameters include latencies of the at least one first memory device and the at least one second memory device.

Example 11 includes a system comprising a processor unit to issue a plurality of memory requests targeting contiguous logical memory addresses; a first memory interface of a first type to couple to at least one first memory device; a second memory interface of a second type to couple to at least one second memory device; and circuitry to interleave the plurality of memory requests among the at least one first memory device and the at least one second memory device.

Example 12 includes the subject matter of Example 11, and further including the at least one first memory device.

Example 13 includes the subject matter of any of Examples 11 and 12, and further including the at least one second memory device.

Example 14 includes the subject matter of any of Examples 11-13, and further including one or more of a battery communicatively coupled to the processor, a display communicatively coupled to the processor, or a network interface communicatively coupled to the processor.

Example 15 includes the subject matter of any of Examples 11-14, and wherein the first memory interface comprises an integrated memory controller.

Example 16 includes the subject matter of any of Examples 11-15, and wherein the second memory interface comprises a Compute Express Link (CXL) interface.

Example 17 includes the subject matter of any of Examples 11-16, and wherein the at least one first memory device comprises a plurality of double data rate (DDR) memory devices and wherein the at least one second memory device comprises a plurality of CXL memory devices.

Example 18 includes the subject matter of any of Examples 11-17, and wherein the circuitry to interleave memory requests comprises a routing table comprising entries mapping logical memory addresses to the first and second memory interfaces.

Example 19 includes the subject matter of any of Examples 11-18, and further including second circuitry to configure the circuitry to interleave memory requests.

Example 20 includes the subject matter of any of Examples 11-19, and wherein the second circuitry implements a basic input/output system (BIOS).

Example 21 includes the subject matter of any of Examples 11-20, and wherein the second circuitry is to analyze parameters of the at least one first memory device and the at least one second memory device and determine suitability of the at least one first memory device and the at least one second memory device for interleaving based on the parameters.

Example 22 includes the subject matter of any of Examples 11-21, and wherein the parameters include channel bandwidths of the at least one first memory device and the at least one second memory device.

Example 23 includes the subject matter of any of Examples 11-22, and wherein the parameters include latencies of the at least one first memory device and the at least one second memory device.

Example 24 includes one or more computer-readable media with code stored thereon, wherein the code is executable to cause a machine to configure a processor to interleave memory requests having contiguous logical memory addresses among at least one first memory device and at least one second memory device, wherein the processor comprises a first memory interface of a first type to couple to the at least one first memory device and a second memory interface of a second type to couple to the at least one second memory device.

Example 25 includes the subject matter of Example 24, and wherein the code is executable to cause the machine to analyze parameters of the at least one first memory device and the at least one second memory device and determine suitability of the at least one first memory device and the at least one second memory device for interleaving based on the parameters.

Example 26 includes the subject matter of any of Examples 24 and 25, and wherein the parameters include channel bandwidths of the at least one first memory device and the at least one second memory device.

Example 27 includes the subject matter of any of Examples 24-26, and wherein the parameters include latencies of the at least one first memory device and the at least one second memory device.

Example 28 includes the subject matter of any of Examples 1-27, and wherein the contiguous addresses are contiguous logical addresses.

What is claimed is:

1. A processor comprising:
   a first memory interface of a first type to couple to at least one first memory device;
   a second memory interface of a second type to couple to at least one second memory device, wherein a first memory device of the at least one first memory device has a bandwidth or latency that is different from a bandwidth or latency of a second memory device of the at least one second memory device; and
   circuitry to interleave memory requests targeting contiguous memory addresses among the at least one first memory device and the at least one second memory device.

2. The processor of claim 1, wherein the first memory interface comprises an integrated memory controller and the second memory interface comprises a Compute Express Link (CXL) interface.

3. The processor of claim 2, wherein the at least one first memory device comprises a plurality of double data rate (DDR) memory devices and wherein the at least one second memory device comprises a plurality of CXL memory devices.

4. The processor of claim 1, wherein the circuitry to interleave memory requests comprises a routing table comprising entries mapping logical memory addresses to the first and second memory interfaces.

5. The processor of claim 1, further comprising second circuitry to configure the circuitry to interleave memory requests.

6. The processor of claim 5, wherein the second circuitry implements a basic input/output system (BIOS).

7. The processor of claim 5, wherein the second circuitry is to analyze parameters of the at least one first memory device and the at least one second memory device and determine suitability of the at least one first memory device and the at least one second memory device for interleaving based on the parameters.

8. The processor of claim 7, wherein the parameters include channel bandwidths of the at least one first memory device and the at least one second memory device.

9. The processor of claim 7, wherein the parameters include latencies of the at least one first memory device and the at least one second memory device.

10. One or more computer-readable media with code stored thereon, wherein the code is executable to cause a machine to:
    configure a processor to interleave memory requests having contiguous memory addresses among at least one first memory device and at least one second memory device, wherein the processor comprises a first memory interface of a first type to couple to the at least one first memory device and a second memory interface of a second type to couple to the at least one second memory device, wherein a first memory device of the at least one first memory device has a bandwidth or latency that is different from a bandwidth or latency of a second memory device of the at least one second memory device.

11. The media of claim 10, wherein the code is executable to cause the machine to analyze parameters of the at least one first memory device and the at least one second memory device and determine suitability of the at least one first memory device and the at least one second memory device for interleaving based on the parameters.

12. The media of claim 11, wherein the parameters include channel bandwidths of the at least one first memory device and the at least one second memory device.

13. The media of claim 11, wherein the parameters include latencies of the at least one first memory device and the at least one second memory device.

14. A system comprising:
    a processor unit to issue a plurality of memory requests targeting contiguous memory addresses;
    a first memory interface of a first type to couple to at least one first memory device;
    a second memory interface of a second type to couple to at least one second memory device, wherein a first memory device of the at least one first memory device has a bandwidth or latency that is different from a bandwidth or latency of a second memory device of the at least one second memory device; and
    circuitry to interleave the plurality of memory requests among the at least one first memory device and the at least one second memory device.

15. The system of claim 14, further comprising the at least one first memory device, wherein a memory device of the at least one first memory device comprises a controller.

16. The system of claim 15, further comprising the at least one second memory device, wherein a memory device of the at least one second memory device comprises at least one memory chip.

17. The system of claim 14, further comprising one or more of: a battery communicatively coupled to the processor, a display communicatively coupled to the processor, or a network interface communicatively coupled to the processor.

18. The processor of claim 1, wherein the first memory device of the at least one first memory device has an underlying storage technology type that is different from an underlying storage technology type of the second memory device of the at least one second memory device.

19. The processor of claim 1, wherein the first interface is to be programmed with interleave information comprising a number of memory targets being interleaved and an interleave granularity, and wherein the first interface is to translate a logical address received in a memory request to a device physical address based on the interleave information.

20. The processor of claim 7, wherein the parameters include channel bandwidths or latencies of the at least one first memory device and the at least one second memory device and wherein the channel bandwidths or latencies of the at least one first memory device and the at least one second memory device are required to be within a particular tolerance interval from each other to be suitable for interleaving.

* * * * *